(12) United States Patent
Kiyomiya et al.

(10) Patent No.: US 6,690,638 B1
(45) Date of Patent: Feb. 10, 2004

(54) SUPPORTING MECHANISM FOR AN OPTICAL DISC REPRODUCING APPARATUS HAVING A SUB-FRAME FOR SUPPRESSING VIBRATION

(75) Inventors: Masaaki Kiyomiya, Saitama-ken (JP); Keiichi Takagi, Saitama-ken (JP); Eiji Hoshinaka, Saitama-ken (JP); Katsumi Ishii, Saitama-ken (JP)

(73) Assignee: Pioneer Electric Corporation, Tokyo (JP)

( * ) Notice: Subject to any disclaimer, the term of this patent is extended or adjusted under 35 U.S.C. 154(b) by 0 days.

(21) Appl. No.: 09/306,572

(22) Filed: May 6, 1999

(30) Foreign Application Priority Data

May 11, 1998 (JP) .......................... 10-145031

(51) Int. Cl.⁷ ................................................. G11B 7/00
(52) U.S. Cl. ..................... 369/247; 369/263; 369/44.14
(58) Field of Search .................... 369/44.11, 44.14, 369/247–248, 263

(56) References Cited

U.S. PATENT DOCUMENTS

| | | | | | |
|---|---|---|---|---|---|
| 4,703,470 | A | * | 10/1987 | Castagna et al. ........ | 369/247 X |
| 5,732,063 | A | * | 3/1998 | Chen .......................... | 369/263 |
| 5,933,407 | A | * | 8/1999 | Watanabe et al. ........... | 369/247 |
| 6,034,941 | A | * | 3/2000 | Ro .............................. | 369/263 |
| 6,125,097 | A | * | 9/2000 | Wu ............................ | 369/263 |

FOREIGN PATENT DOCUMENTS

JP           63-298795           12/1988

\* cited by examiner

*Primary Examiner*—W. R. Young
(74) *Attorney, Agent, or Firm*—Arent Fox Kintner Plotkin & Kahn, PLLC

(57) ABSTRACT

A main frame is supported in a box, by first elastic members. An optical disc driving device is mounted on the main frame. A sub-frame is supported on the main frame by second elastic members.

6 Claims, 8 Drawing Sheets a f₀=100Hz
b f₀=110Hz
c f₀=130Hz a f₀=100Hz
b f₀=110Hz
c f₀=130Hz

SUPPORTING MECHANISM FOR AN OPTICAL DISC REPRODUCING APPARATUS HAVING A SUB-FRAME FOR SUPPRESSING VIBRATION

BACKGROUND OF THE INVENTION

The present invention relates to a supporting mechanism for an optical disc driving device.

In an optical disc player, there is a limit to ability to accurately control the trucking servo and focusing servo against the external vibration applied from the outside and the internal vibration. In particular, in the case of the computer disc player, the vibration generated inside the player at high speed reading becomes problem.

FIG. 9 shows a device for damping the external vibration. As shown in the drawing, a main frame 4 is mounted on a box 1 by three elastic members 2 at corners. On the main frame 4, a turntable 6 and a spindle motor (not shown) for rotating the turntable are provided.

A pickup 5 for reading information recorded in a disc is slidably mounted on a pair of guide rails 11a and 11b. The pickup engages with a driving screw 8 so as to be moved in a radial direction of a disc loaded on the turntable 6. The driving screw 8 is connected to a rotating shaft of a stepping motor 9 so that the pickup 5 is moved along the guide rails 11a and 11b by the rotation of the driving screw 8.

In operation, the main frame 4 including various members mounted therein are vibrated by imbalance of the disc and others when the disc is rotated by the spindle motor. In particular, at high speed reading of information, the rotating speed of the disc is increased, and hence the vibration is accordingly increased.

Since the main frame 4 is mounted in the box 1 through the elastic members 2, the vibration transmitted from the main frame 4 to the box 1 is reduced. The external vibration transmitted to the box 1 is damped by the elastic members 2. Therefore, the quantity of vibration transmitted to the main frame 4 is reduced.

FIG. 10 shows a vibration model of the structure shown in FIG. 9, where the elastic member 2 has a stiffness of k and a coefficient of loss (viscosity) of $\mu$, and a main frame device 20 has a mass of m.

There is a following relationship if external force is F and displacement of the main frame device is x, $$m d2x/dt2 = F - \mu dx/dt - kx$$

If the equation of motion is solved under a condition, the relationship between the resonance frequency $f_0$ and the mass m can be obtained. The resonance frequency can be expressed as follows.

$$f_0 = 1/(2\pi) * (k/m)1/2$$

The ratio of the resonance frequency $f_1$ for the box 1 of mass $m_1$ to the resonance frequency $f_0$ for the main frame device 20 of mass $m_0$ is follows.

$$f_0/f_1 = (m_1/m_1)1/2$$

If the mass $m_0$ is multiplied by 2, the resonance frequency $f_1$ becomes about $0.7 f_1$.

Thus, the transmissibility can be expressed by the mass and the stiffness and the coefficient of loss of the elastic member. It is possible to obtain a desired transmissibility by selecting the mass, stiffness and coefficient of loss.

From the foregoing, it will be understood that in order to interrupt the transmittance of the external vibration to the main frame device 20, it is effective to reduce the stiffness of the elastic member 2 and to increase the mass of the main frame device supported by the elastic member 2.

However, it is desirable to reduce the size of the device. Since it is difficult to increase the mass of the main frame device 20, the stiffness of the elastic member 2 is reduced heretofore.

Thus, the external vibration can be damped.

However, the own vibration of the main frame 4 caused by the imbalance of the disc and others can not be damped since the stiffness of elastic member is reduced.

If the main frame vibrates, the pickup 5 mounted in the main frame 4 through guide rails 11a and 11b is vibrated. If the pickup vibrates, the servo operation for controlling the information reading operation may be disturbed. As a result, the information can not be accurately read out.

SUMMARY OF THE INVENTION

An object of the present invention is to provide a device which may damp an internal vibration caused by operation of driving mechanisms in the device.

According to the present invention, there is provided a supporting mechanism for an optical disc driving device, comprising, a box, a main frame provided in the box, first elastic members elastically connecting the main frame to the box, an optical disc driving device mounted on the main frame, the optical disc driving device including a spindle motor and a turntable securely mounted on a rotating shaft of the spindle motor, a sub-frame, and second elastic members elastically connecting the sub-frame to the main frame.

These and other objects and features of the present invention will become more apparent from the following detailed description with reference to the accompanying drawings.

DETAILED DESCRIPTION OF THE PREFERRED EMBODIMENT

Figure 1:
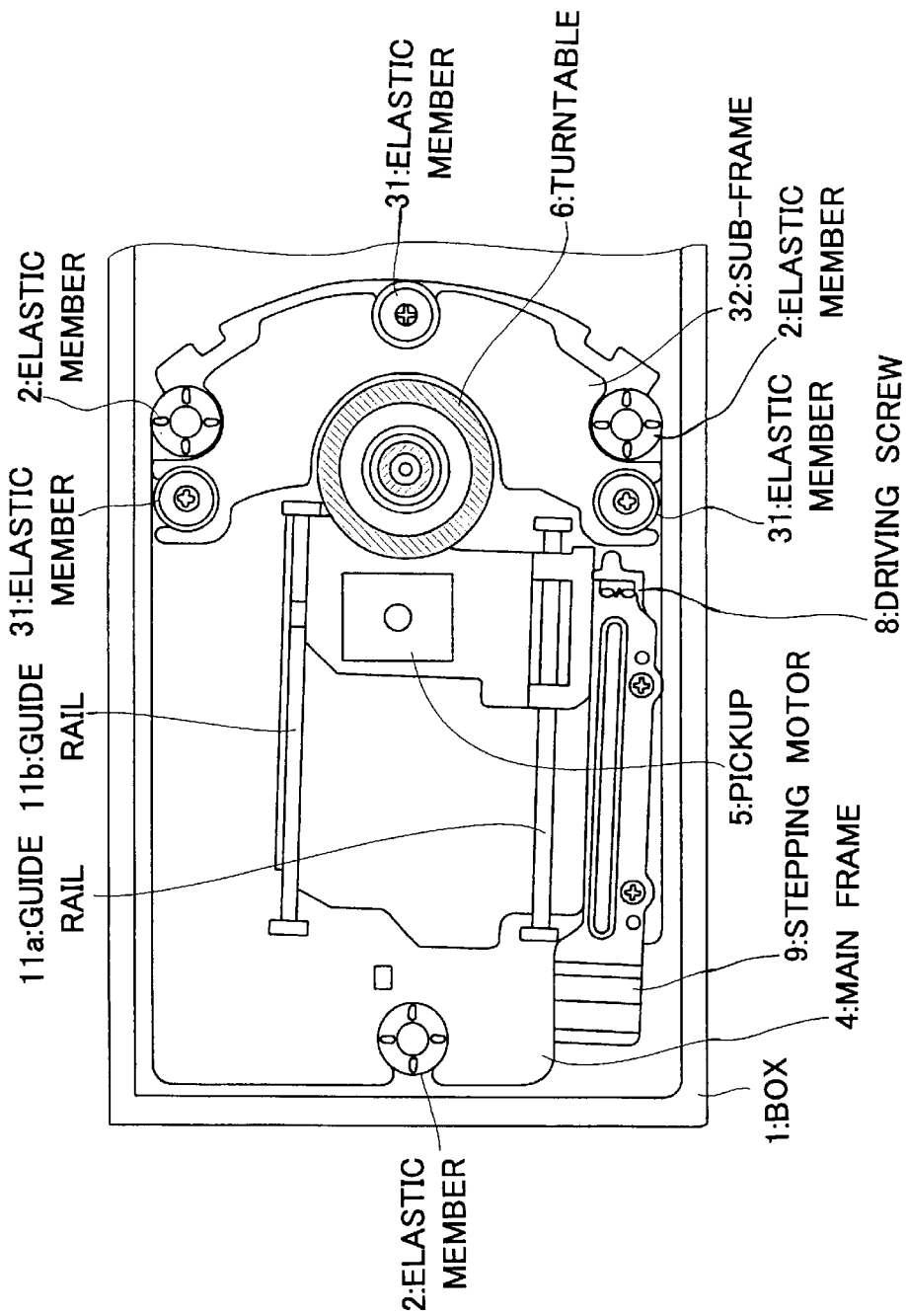
FIG. 1 is a plan view showing an optical disc reproducing device according to the present invention.
Figure 2:
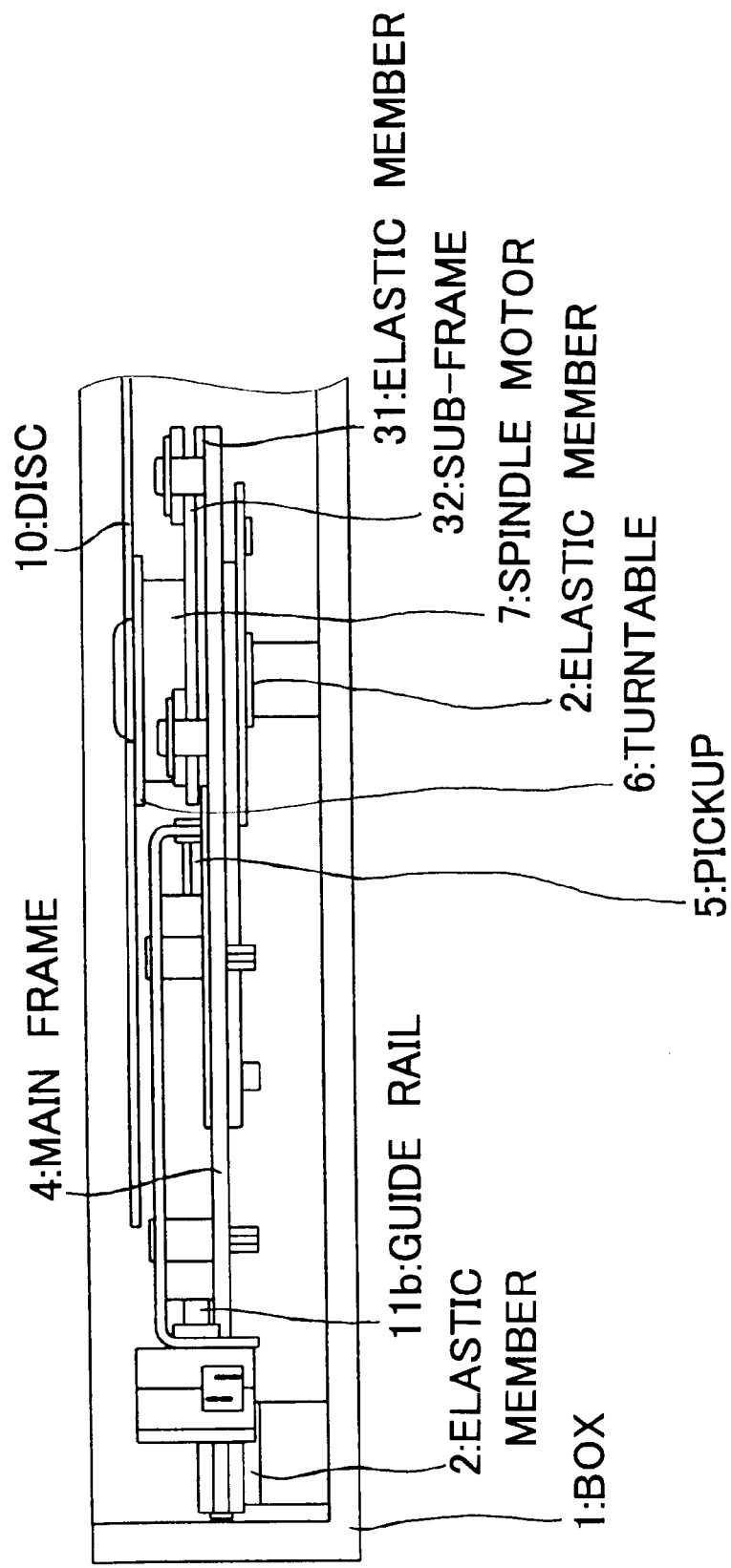
FIG. 2 is a sectional view of the device.
Figure 9:
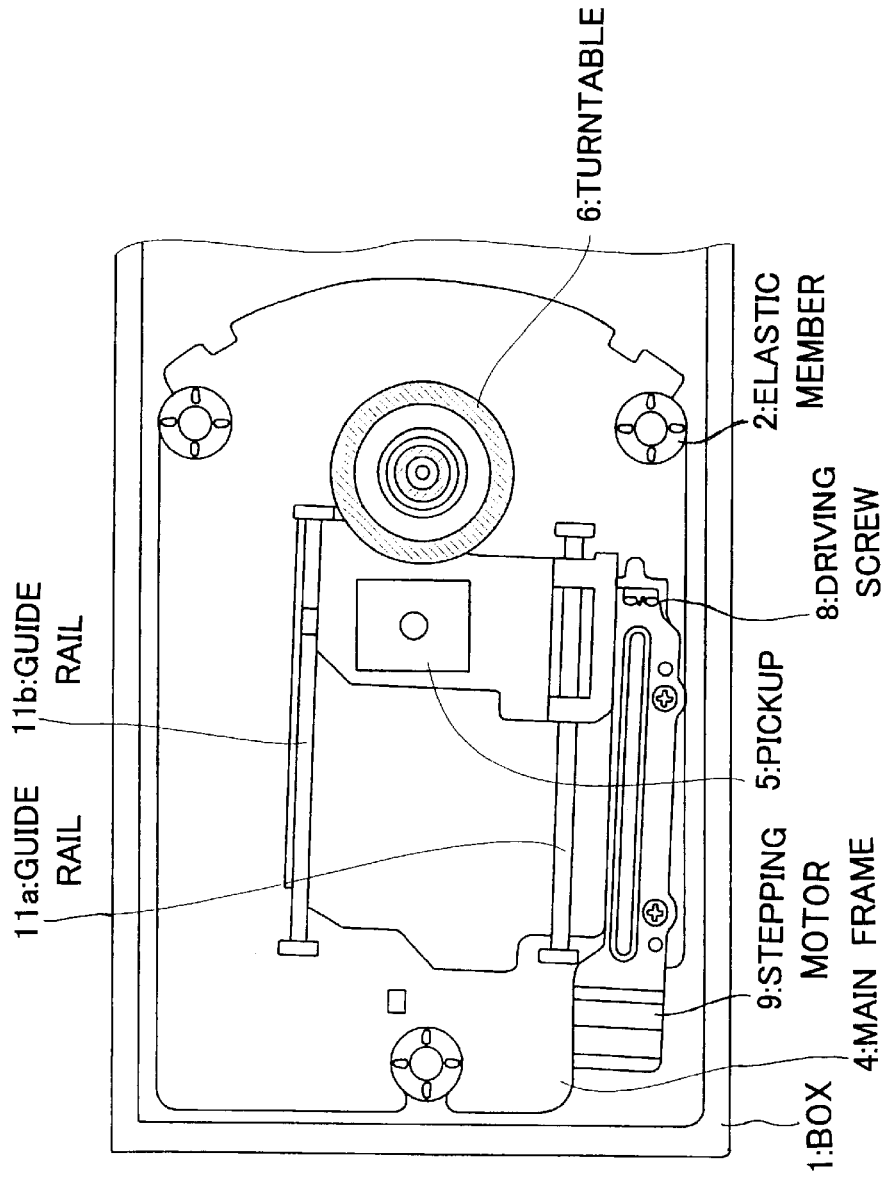
FIG. 9 is a plan view showing a conventional disc reproducing device.

Referring to FIGS. 1 and 2, the same parts as FIG. 9 are identified with the same reference numerals as FIG. 9 and the explanation for the parts will be omitted.

In the box 1, the main frame 4 is elastically supported by the first elastic members 2. A sub-frame 32 is mounted on the main frame 4 through second elastic members 31.

The turntable 6 for rotating an optical disc 10 is securely mounted on a rotating shaft of a spindle motor 7 which is mounted on the main frame 4.

The pickup 5 is slidably mounted on the guide rails 11a and 11b mounted on the main frame and engaged with the driving screw 8. The driving screw 8 is connected to the stepping motor 9.

The rotation of the rotating shaft of the stepping motor 9 causes the screw 8 to rotate, which in turn moves the pickup in the radial direction of the disc 10. The moving direction of the pickup is determined by the rotating direction of the rotating shaft of the stepping motor 9.

When the external vibration is applied to the box 1, the external vibration is not transmitted to the main frame 4 by the interruption of the first elastic members 2.

When the optical disc 10 is rotated, the main frame 4 is vibrated by the imbalance of the disc 10. The vibration is transmitted to the sub-frame 32 through the second elastic members 31.

Therefore, the sub-frame 32 is vibrated in accordance with the transmitting characteristic of the sub-frame 32 and the second elastic member 31.

At a frequency sufficiently lower than the resonance frequency of both vibration systems, the sub-frame 32 vibrates together with the main frame 4. At a frequency sufficiently higher than the resonance frequency, the vibration is hardly transmitted from the main frame 4 to the sub-frame 32.

At a frequency approximately equal to the resonance frequency, vibration is enhanced when braking is small, and the influence of secondary resonance does not occur when the braking is large.

On the other hand, the phase of the vibration of the sub-frame is the same as that of the transmitted vibration at a frequency lower than the resonance frequency, is a reverse phase at a frequency higher than the resonance frequency, and 90 degrees phase at the resonance frequency.

Therefore, the sub-frame 32 has vibration suppressing effect at a frequency lower than the resonance frequency by selecting the resonance frequency and the coefficient of loss.

Figure 3:
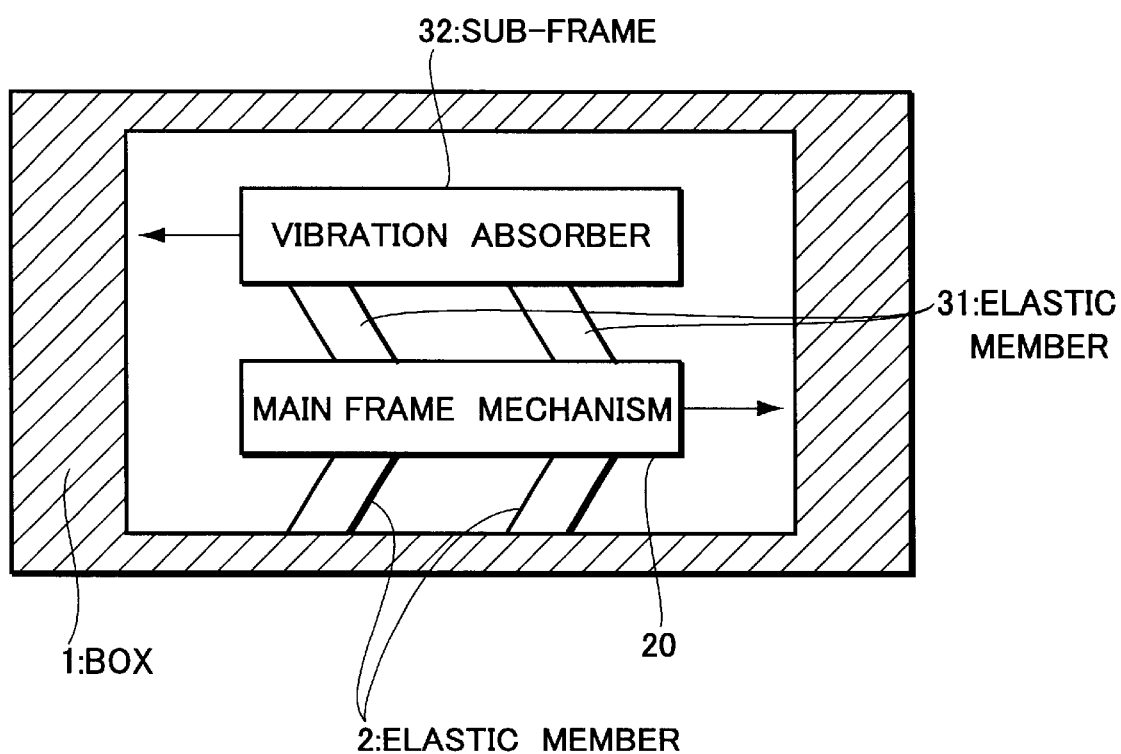
FIG. 3 is an illustration of a vibration model of the device.

FIG. 3 shows a vibration model of the disc reproducing device of the present invention.

Figure 10:
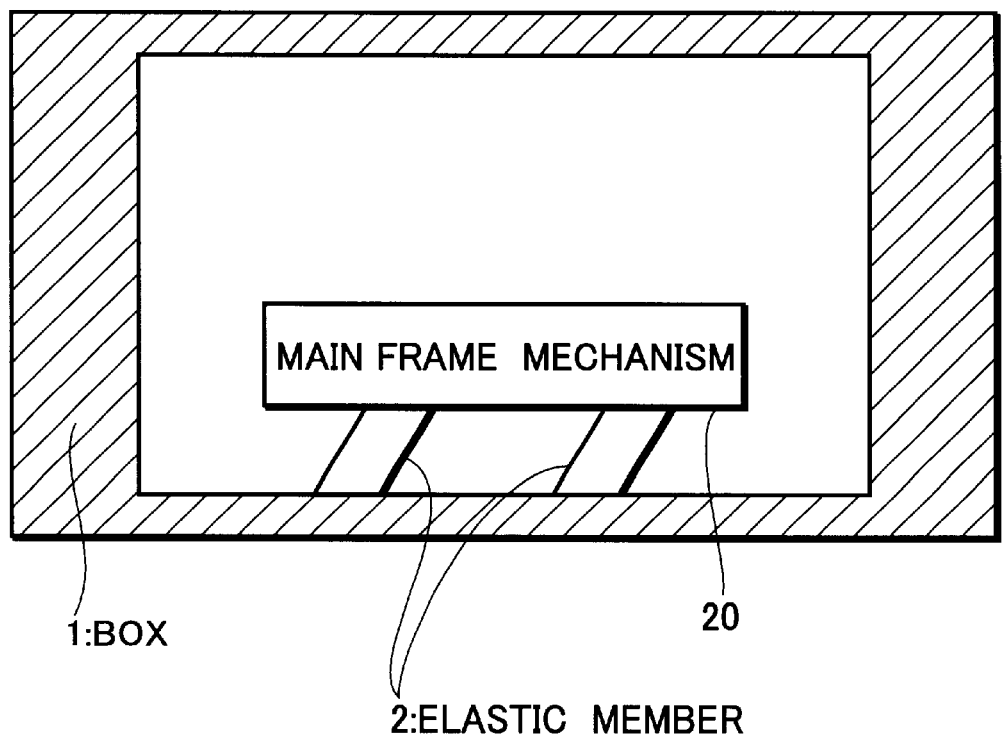
FIG. 10 is an illustration of a vibration model of the conventional device.

An equation of motion similar to the equation of motion of FIG. 10 can be obtained from FIG. 3.

FIGS. 4–7 show results of simulations based on the model of FIG. 3.

Figure 4:
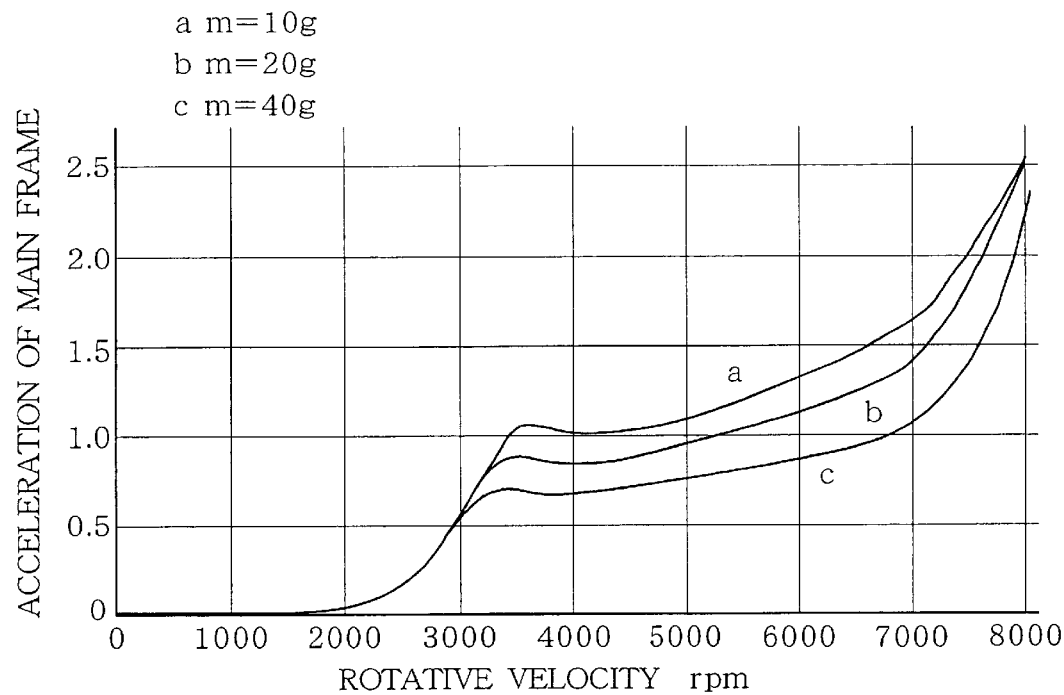
FIGS. 4 to 8 are graphs showing a vibration characteristic of the device.
Figure 5:
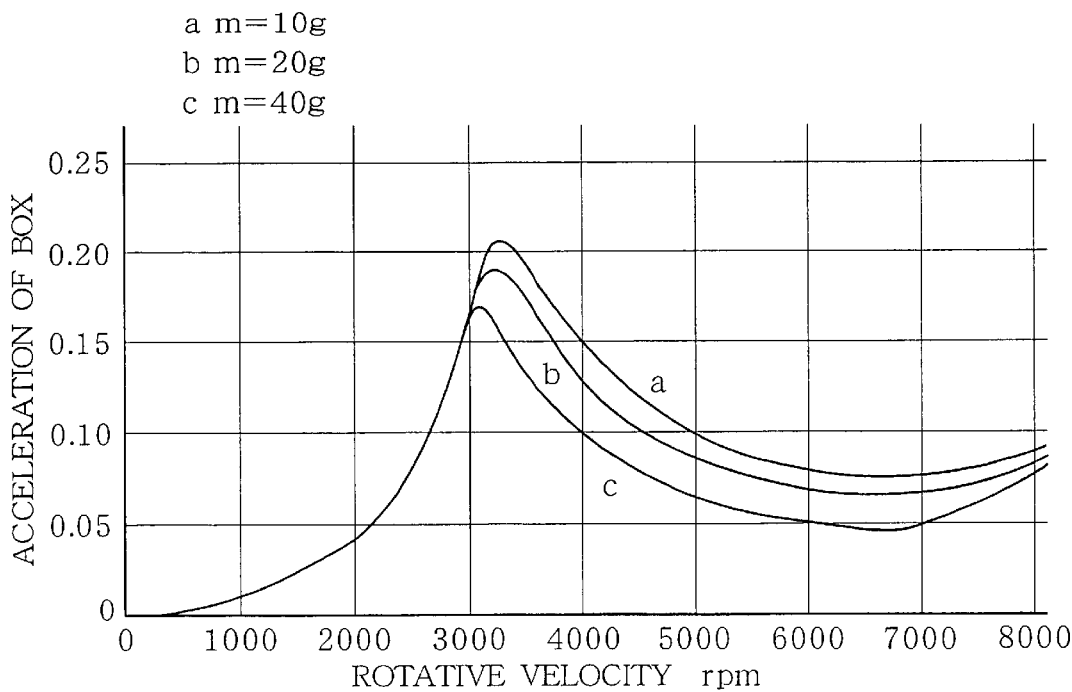

FIGS. 4 and 5 are results of simulations where the mass m of the sub-frame 32 is changed at the resonance frequency of constant 120 Hz. In addition, FIGS. 4 and 5 show vibration acceleration of the main frame device 20 and the box 1 to the rotative velocity of the disc as the result of calculation in the conditions where the imbalance of the disc is 0.5 g-cm and the mass of the sub-frame 32 is 10 g, 20 g and 40 g.

It will be understood from FIGS. 4 and 5 that the vibration suppression effect is high in the range between about 4,000 and 7,000 rpm as the mass of the sub-frame increases, and that a large mass of the main frame device 20 is effective to reduce the acceleration of the box 1 and the main frame 4.

Figure 6:
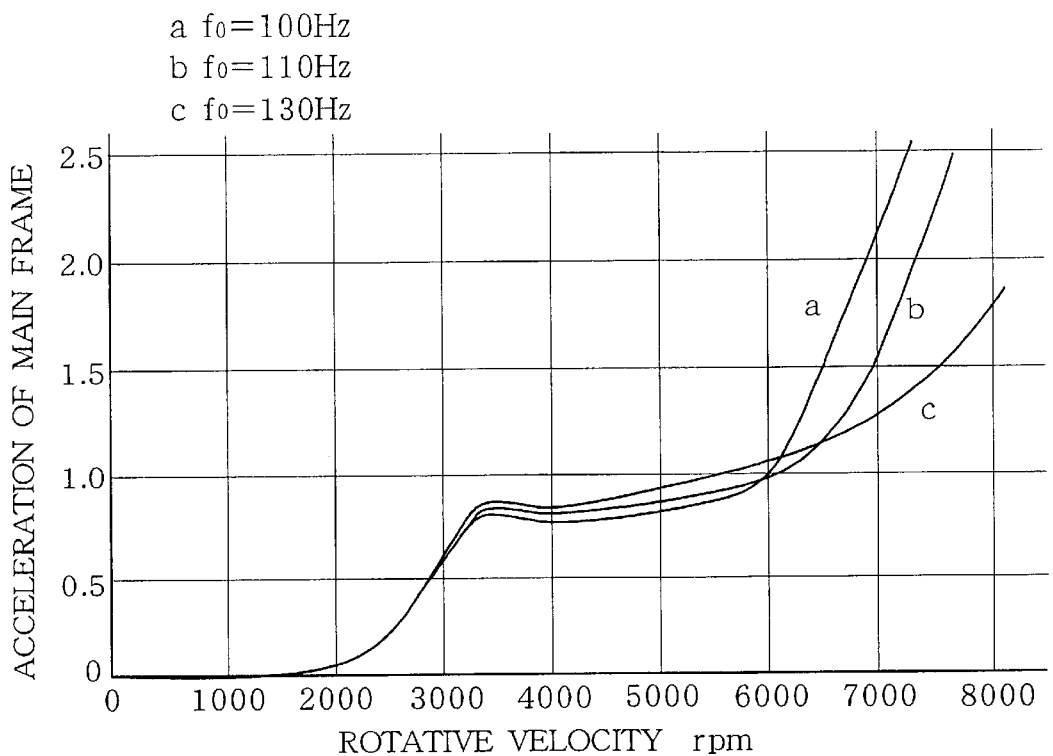
Figure 7:
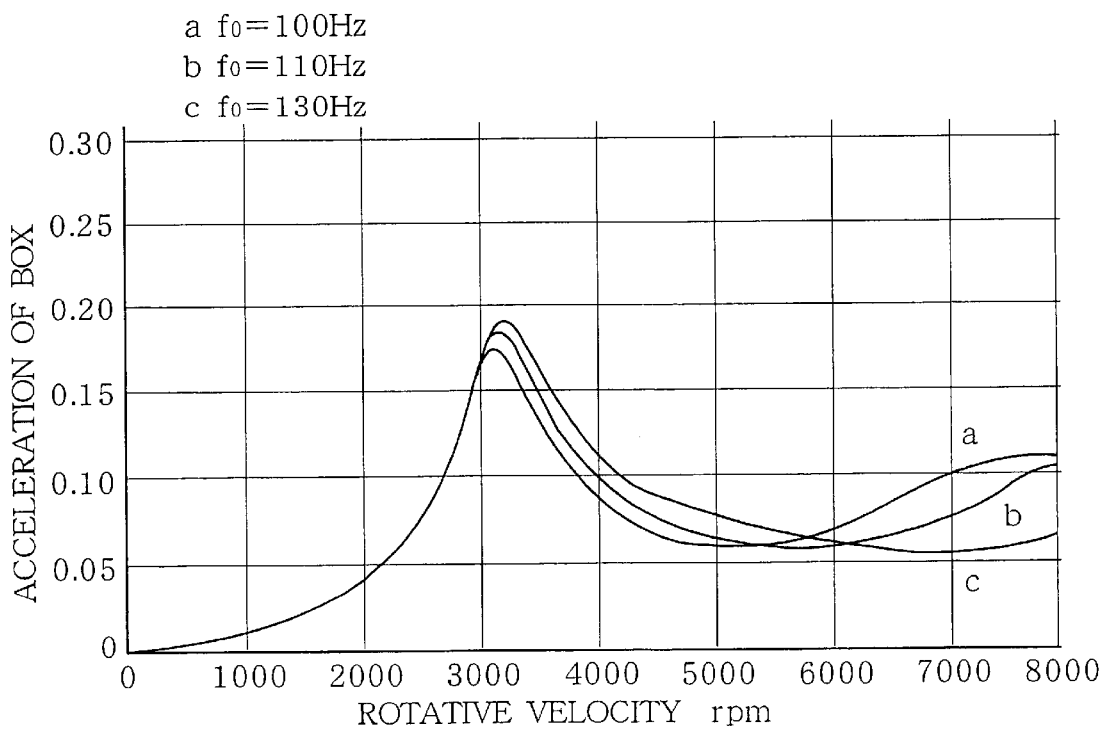

FIGS. 6 and 7 are results of simulations where the mass m of the sub-frame 32 is 30 g, and the resonance frequency of the sub-frame 32 is changed. In addition, FIGS. 4 and 5 show vibration acceleration of the main frame device 20 and the box 1 to the rotative velocity of the disc as the result of calculation in the conditions where the imbalance of the disc is 0.5 g-cm and the resonance frequency of the sub-frame 32 is 100 Hz, 110 Hz and 130 Hz.

It will be understood from FIGS. 6 and 7 that the vibration suppression effect is high, in the condition when the rotative velocity is set 6,000 rpm, the resonance frequency $f_0$ is 110 Hz, and when the rotative velocity is set 7,000 rpm, $f_0$ is 130 Hz in the range between about 4,000 and 7,000 rpm as the mass of the sub-frame increases, and that a large mass of the main frame device 20 is effective to reduce the acceleration of the box 1 and the main frame 4.

Figure 8:
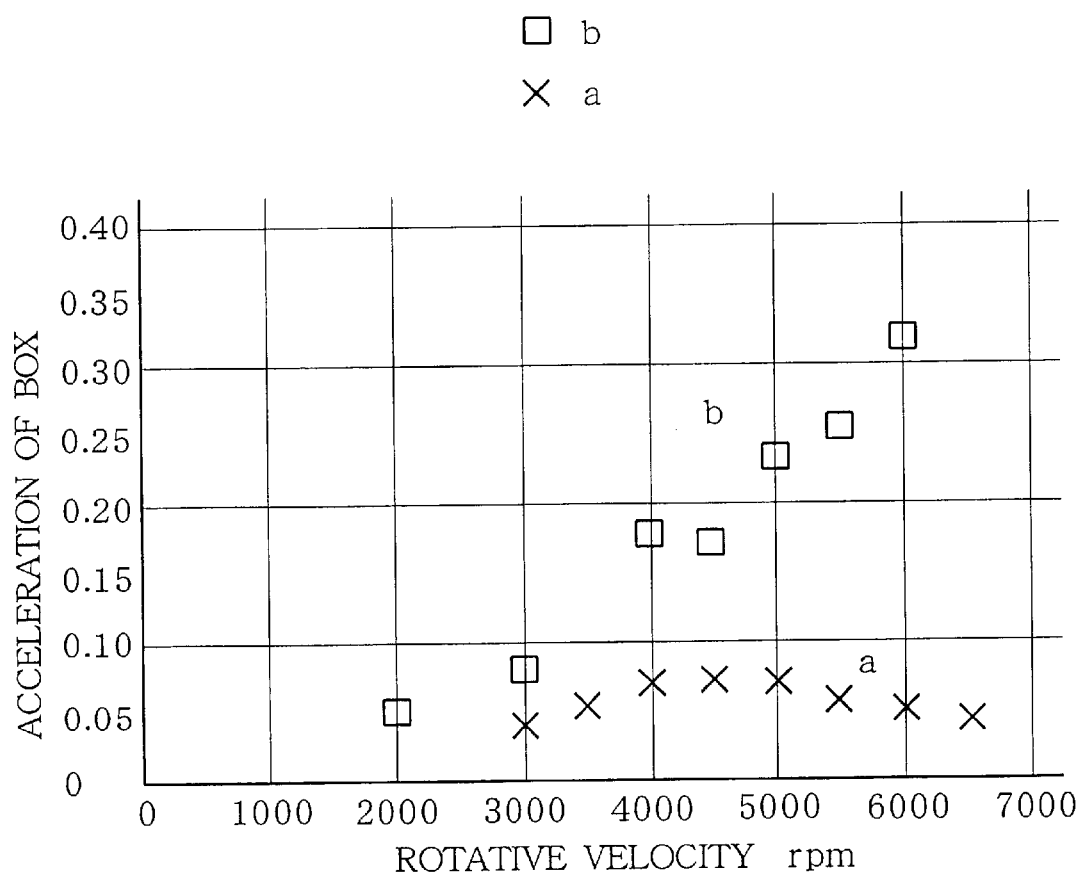

FIG. 8 shows measured values of the characteristic of the vibration damping device according to the present invention, namely FIG. 8 shows vibration acceleration of the box to the rotative velocity of the disc when the imbalance of the disc is 0.5 g-cm. In the graph, the mark a indicates results of the present invention, and the mark b shows results of the conventional device in which the vibration damping device by the sub-frame is not provided.

It will be seen that the box acceleration is 0.07 G at 6,000 rpm when provided with the damping device, and the box acceleration is 0.27 G when not provided with the damping device, and that present invention has a damping effect.

Here, if the rotative velocity is R rpm, the resonance frequency f is R/60, and hence if the rotative velocity is 6,000 rpm, the resonance frequency f is 100 Hz.

It is preferable that the weight of the sub-frame including mounted members is 1/10–1/3 of the whole weight of the main frame including mounted members so as to suppress the main frame at a high speed rotation of the disc, from a point of view of the positional limitation of respective component members.

Furthermore, it is necessary that the sub-frame is thin in order to mount the optical reproducing device in the computer. To this end, it is preferable that the sub-frame has a shape of a flat plate, and that the sub-frame is made of metal from a point of view of weight.

By disposing the surface of the sub-frame so as to be orthogonal with the shaft of the spindle motor, the vibration suppression effect of the sub-frame is increased.

The elastic member 2 (31) is made of rubber or plastic in order to decrease the thickness of the device and enhance the braking effect.

In accordance with the present invention, the external vibration is damped by the first elastic member, thereby preventing external vibration from transmitting to the main frame, the vibration of the sub-frame which is caused by the imbalance of the disc and others is suppressed by the damping effect of the composition of the sub-frame and the second elastic member. Thus, it is possible to accurately read information recorded on the optical disc at a high speed rotation of the disc.

While the invention has been described in conjunction with preferred specific embodiment thereof, it will be understood that this description is intended to illustrate and not limit the scope of the invention, which is defined by the following claims.

What is claimed is:

1. A supporting mechanism for an optical disc reproducing apparatus, comprising:

a box;

a main frame provided in the box for mounting a pick-up to read an optical disc and an optical disc driving device thereon, the optical disc driving device including a spindle motor and a turntable mounted on a rotating shaft of the spindle motor;

first elastic members elastically connecting the main frame to the box;

a sub-frame disposed between the main frame and the optical disc on the turntable for suppressing vibration at a predetermined frequency; and second elastic members elastically connecting the sub-frame to the main frame, wherein the sub-frame has a shape of a substantially flat plate.

2. The mechanism according to claim 1, wherein the sub-frame is made of metal.

3. The mechanism according to claim 1, wherein the second elastic member is made of either rubber or plastic.

4. A supporting mechanism for an optical disc reproducing apparatus, comprising:

a main frame provided with a spindle motor for rotating an optical disc and a pick-up for reading the optical disc, the main frame having a substantially flat portion;

a box for storing the main frame;

first elastic members for elastically connecting the main frame to the box;

a sub-frame disposed between the main frame and the optical disc and having a shape of a substantially flat plate; and second elastic members for elastically connecting the sub-frame to the main frame.

5. An optical disc reproducing apparatus, comprising:

a main frame provided with a spindle motor for rotating an optical disc on a turntable and a pick-up for reading the optical disc;

a box for storing the main frame;

first elastic members for elastically connecting the main frame to the box;

a sub-frame disposed between the main frame and the optical disc on the turntable and having a shape of a substantially flat plate; and second elastic members for elastically connecting the sub-frame to the main frame, wherein the reproducing apparatus reads information from the optical disc disposed on the turntable, while the sub-frame reduces vibration generated due to an imbalance of the optical disc.

6. A supporting mechanism for an optical disc reproducing apparatus, comprising:

a main frame provided with a spindle motor for rotating an optical disc on a turntable and a pick-up for reading the optical disc;

a box for storing the main frame;

first elastic members for elastically connecting the main frame to the box;

a sub-frame disposed between the main frame and the optical disc on the turntable and having a shape of a substantially flat plate; and second elastic members for elastically connecting the sub-frame to the main frame, wherein the sub-frame has a thickness so as not to interfere against the optical disc disposed on the turntable in a direction of height of the box.

* * * * *

UNITED STATES PATENT AND TRADEMARK OFFICE
CERTIFICATE OF CORRECTION

PATENT NO. : 6,690,638 B1
DATED : February 10, 2004
INVENTOR(S) : Kiyomiya et al.

It is certified that error appears in the above-identified patent and that said Letters Patent is hereby corrected as shown below:

Title page,
Item [73], Assignee, please correct to read as follows:
-- Pioneer Electronic Corporation, Tokyo (JP) --

Signed and Sealed this

Twenty-first Day of December, 2004

JON W. DUDAS
*Director of the United States Patent and Trademark Office*